Figure 1:
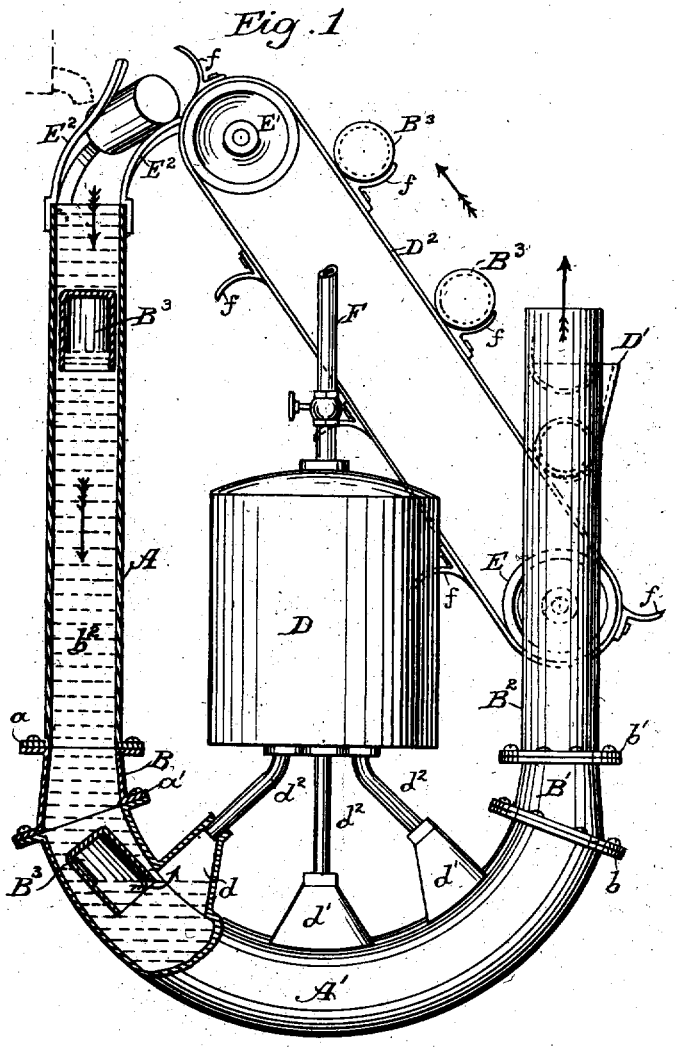

F. M. GRAHAM.

AIR COMPRESSOR.

No. 11,654. Reissued Mar. 8, 1898.

WITNESSES

J. B. Bayless

A. R. Boone

INVENTOR

F. M. Graham

By Bond & Wright

Attys.

UNITED STATES PATENT OFFICE.

FRANCIS M. GRAHAM, OF SAN JOSÉ, CALIFORNIA.

AIR-COMPRESSOR.

SPECIFICATION forming part of Reissued Letters Patent No. 11,654, dated March 8, 1898.

Original No. 592,586, dated October 26, 1897. Application for reissue filed December 14, 1897. Serial No. 661,907.

*To all whom it may concern:*

Be it known that I, FRANCIS M. GRAHAM, a citizen of the United States, residing at San José, in the county of Santa Clara and State of California, have invented certain new and useful Improvements in Air-Compressors; and I do hereby declare the following to be a full, clear, and exact description of said invention, such as will enable others skilled in the art to which it most nearly appertains to make and practice the same.

The present invention relates to a certain new and useful apparatus for compressing air, gas, &c., which consists in the arrangement of parts and details of construction, as will be hereinafter fully shown in the drawings and described and pointed out in the specification.

The object of the invention is to provide a simple and inexpensive compressing apparatus which shall be so constructed as to be operated by a body of water flowing through a stand-pipe.

In order to fully comprehend my invention, reference must be had to the accompanying sheet of drawings, forming a part of this application, wherein—

Figure 2:
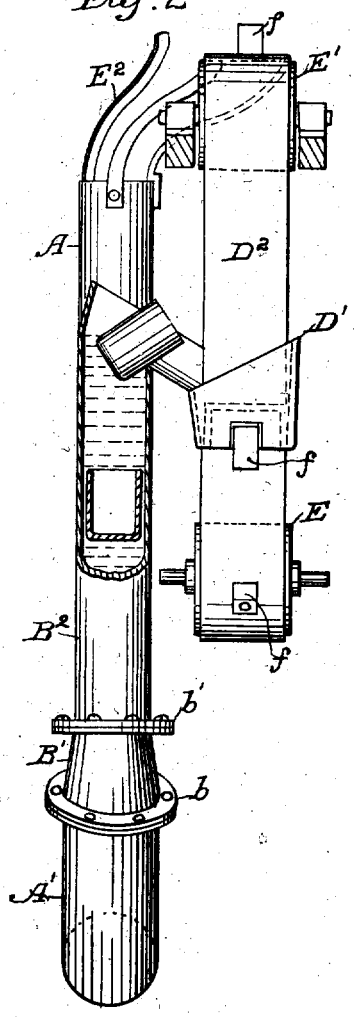
Figure 3:
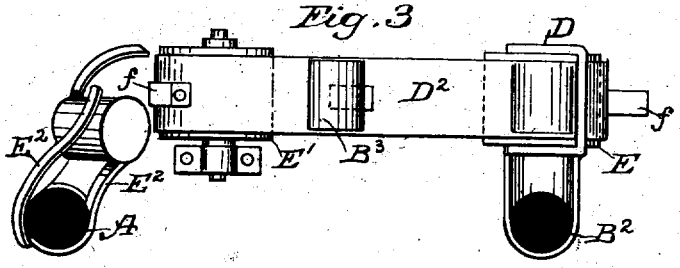

Figure 1 is a front view in elevation, partly broken away. Fig. 2 is side view in elevation, and Fig. 3 is a top plan view showing the elevator for the cups and the upper end of the inlet and outlet pipes.

In the drawings the letter A is used to indicate the main vertical stand-pipe, which pipe is of any suitable length—say one hundred (100) or more feet—depending upon the compression desired, and about ten (10) inches, more or less, in diameter. The lower end of the main vertical stand-pipe is outwardly flanged, as shown at $a$, and said end is connected to the flanged end $a'$ of the curved joint A′ by means of the coupling B. The coupling B is slightly larger in diameter than the diameter of the pipe A. To the opposite flanged end $b$ of the joint A′ is connected, by means of the coupling B′, the lower flanged end $b'$ of the vertical pipe $B^2$. This pipe, while running parallel with the main vertical pipe A, is considerably less in length, extending upwardly about two-thirds the height of the said main pipe. The coupling B′, like the coupling B, is slightly larger in diameter than the vertical pipe $B^2$, although said pipe is equal in diameter to that of the main pipe A. This pipe $B^2$ constitutes the "outlet-pipe" and hereinafter shall be so designated, the main pipe A being termed the "inlet-pipe." Within the passage-way $b^2$ thus formed by the inlet-pipe A, the outlet-pipe $B^2$, and the connected joint A′ are fitted, so as to move freely therein, the cups $B^3$, one end of which is opened. These cups are of such a size as to move easily within the passage-way $b^2$, and in length they are about ten inches long. The size of the cups, it will be understood, will vary in accordance with the diameter of the pipes A and $B^2$.

Within the upper face of the curved joint A′ is cut a series of slots $d$, which are covered by the chambers $d'$. These chambers each communicate by pipes $d^2$ with the receiver D, located a short distance above the curved joint A′ and between the pipes A and $B^2$, as shown.

As the cups $B^3$ enter the inlet or main pipe A the pressure of the body of water flowing therethrough forces the cups downward within the main pipe, through the curved joint, and up the outlet-pipe until forced therefrom, which it does as the outlet end of this pipe is considerably below the inlet end of the pipe A. The cups $B^3$ as discharged from within the outlet-pipe fall into a tapering open-bottom receptacle D′, secured at the upper end of the outlet-pipe. Below this receptacle runs the endless conveyer $D^2$, which travels over the rolls E E′, located, respectively, a short distance below the receptacle D′ and a short distance above the inlet-pipe $a$. As the cups fall to the bottom of the receptacle they rest horizontally upon the endless carrier or conveyer $D^2$ and are removed from within the receptacle D′ and engaged by one of the teeth or projections $f$, carried by the conveyer.

The cups as carried over the upper roll E′ are discharged into the inclined chute or runway $E^3$, secured to the upper end of the inlet-pipe A, by means of which inclined chute or runway the cups are turned from a horizontal to a vertical position with the open end downward, in which position they enter the inlet-pipe A. These cups contain the air or gas, &c., which is to be compressed. As carried downward within the inlet-pipe the pressure of the water therein, the cups being in a vertical position with the open end downward, serves to prevent the air or gas escaping from within the cups. However, as the cups are tilted over and forced into and through the curved joint the air or gas gradually escapes from within the cups and, being lighter than the water, finds an outlet from within the curved joint through the slots $d$ into the chamber $d'$, from which chambers it escapes into the receiver through the pipes $d^2$.

The compressed air or gas is led from the receiver to any convenient or desired place by means of the outlet-pipe F.

The position of the cups as carried through the curved joint is gradually reversed, for they enter therein with the open end downward and are discharged therefrom into the outlet-pipe with the open end upward, the cups being thus completely turned over, so that all gas or air carried thereby will be completely expelled therefrom.

Having thus described my invention, what I claim as new, and desire to secure protection in by Letters Patent, is—

1. In an air-compressing apparatus, the combination with the vertical water-inlet pipe, of the vertical water-outlet pipe of less length than the inlet-pipe, the curved joint united to the lower ends of the inlet and outlet pipes, of air-escape openings formed in said joint, a receiver located above the said joint, pipe connection between the receiver and the escape-openings of the joint, and the cups fitted to move within the passage-way formed by the pipes and curved joint.

2. In an air-compressing apparatus, the combination with the vertical water-inlet pipe, of the vertical water-outlet pipe of less length than the inlet-pipe, the curved joint united to the lower ends of the inlet and outlet pipes, of air-escape openings formed in the curved joint, a receiver located above the said joint, pipe connection between the receiver and the escape-openings of the joint, the cups fitted to move within the passage-way formed by the pipes and the curved joint, and of the elevator or conveyer which receives the cups as discharged from the outlet-pipe and delivers the same to the inlet-pipe.

3. In an air-compressor, the combination with the vertical water-inlet pipe, of the vertical water-outlet pipe, the curved joint connecting the lower end of the pipes, the air-escape openings formed in the curved joint, air-chambers with which said openings communicate, a receiver located above the curved joint, pipe connections between the receiver and the said air-chambers, the cups fitted to move within the passage-way formed by the inlet and outlet pipes and the curved joint, the open hopper secured to the upper end of the outlet-pipe, an endless traveling carrier or conveyer arranged to receive the cups as discharged from the outlet-pipe into the hopper and convey the same to the inlet-pipe, and of the chute secured to the inlet-pipe into which the cups are discharged from the endless carrier.

4. In an air-compressor, the combination, with the downwardly-extending water-inlet pipe, of the water-outlet pipe extending upward to a less height than the inlet-pipe, a water-conduit connecting the lower portions of said pipes, an air-escape pipe leading from the upper side of said conduit, and an air-conveying device moving into the upper end of the water-inlet and by said movement delivering air into said pipe, substantially as described.

5. In an air-compressor, the combination, with the downwardly-extending water-inlet pipe, of the water-outlet pipe extending upward to a less height than the inlet-pipe, a water-conduit connecting the lower portions of said pipes, an air-escape pipe leading from the upper side of said conduit, and a series of cups circulating into and out of the water in the inlet-pipe, and having concave surfaces directed downward when entering said water, substantially as described.

6. In an air-compressor, the combination, with the downwardly-extending water-inlet pipe, of the water-outlet pipe extending upward to a less height than the inlet-pipe, a water-conduit connecting the lower portions of said pipe, an air-escape pipe leading from the upper side of said conduit, and a movable air-conveyer having a surface adjacent to the upper water-line of the inlet-pipe directed downward or in the direction of flow of the water, substantially as described.

FRANCIS M. GRAHAM.

Witnesses:
F. M. WRIGHT,
W. R. BOONE.